United States Patent [19]

Harston

[11] Patent Number: 5,038,919

[45] Date of Patent: Aug. 13, 1991

[54] CONVEYORS WITH TRANSVERSELY SPACED FLIGHTS

[75] Inventor: John C. Harston, Clevedon, England

[73] Assignee: Kliklok Corporation, Decatur, Ga.

[21] Appl. No.: 332,350

[22] Filed: Mar. 31, 1989

[30] Foreign Application Priority Data

Mar. 31, 1988 [GB] United Kingdom ............... 8807659

[51] Int. Cl.⁵ .......................................... B65G 15/14
[52] U.S. Cl. ................................. 198/626.1; 198/841
[58] Field of Search ................. 198/626, 627, 803.11, 198/473.1, 570, 841, 626.1, 626.5, 484.1

[56] References Cited

U.S. PATENT DOCUMENTS

| | | | |
|---|---|---|---|
| 1,913,001 | 6/1933 | Ross | 198/627 X |
| 3,198,316 | 8/1965 | Bivans | 198/473.1 |
| 3,325,977 | 6/1967 | Kirsten | 198/627 X |
| 3,669,244 | 6/1972 | Pagdin et al. | 198/570 X |
| 3,779,364 | 12/1973 | Kammann | 198/803.11 X |
| 3,825,108 | 7/1974 | Stone | 198/570 X |
| 4,152,960 | 5/1979 | Detjen | 198/627 X |
| 4,353,276 | 10/1982 | Ackerfeldt | 198/570 X |
| 4,768,642 | 9/1988 | Hunter | 198/570 X |

Primary Examiner—D. Glenn Dayoan
Attorney, Agent, or Firm—King and Schickli

[57] ABSTRACT

A conveyor comprises two parallel endless chains (20, 21) carrying flights (22, 23), and guide tracks (24, 25) for the chains in a forwarding run consist of an inner guide track (24) and an outer guide track (25) with respect to the direction in which the flights (22, 23) project from the chains, the guide tracks (24, 25) also being disposed so that one chain (20) overlaps the other (21) in the direction transverse to the direction in which the flights project. The guide tracks (24, 25) are formed by channels (29) with low-friction liners (31) in a single elongate guide member (30) secured to a frame member (32) by bolts (33).

23 Claims, 9 Drawing Sheets

CONVEYORS WITH TRANSVERSELY SPACED FLIGHTS

This invention relates to conveyors, more particularly but not exclusively—for packaging equipment, in which a pair or pairs of parallel chains or other endless drive members, e.g., gear-belts, carry flights for propelling, retaining and spacing cartons or like containers, or products through stations where operations are performed, such as insertion of products, and closing and gluing, e.g., with leading flights on one chain or pair of chains and trailing or propelling flights on another chain or pair of chains.

BACKGROUND OF THE INVENTION

One usual arrangement is for pairs of chains to be guided through upper forwarding runs along tracks in a common plane and through lower return runs, around drive sprockets on a common axis between the runs at one end of the conveyor, and around return sprockets on another common axis between the runs at the other end of the conveyor. The closeness of the transverse spacing of the flights on the conveyor chains is limited by the widths of the chains and the necessary clearance between them, which imposes a limit on the minimum width of container (or length of sleeve carton) that can be handled by the conveyor. There is, of course, no theoretical limit to the maximum lateral spacing of the flights, and adjustment of the spacing between the practical limits can be readily effected by providing for adjustment of the drive and return sprockets along their respective axes and possibly also with adjustment of the lateral spacing of the guide tracks for the upper forwarding run.

Another known arrangement has a pair of chains carrying propelling flights and an intermediate chain carrying leading flights, the chains again being guided through upper forwarding runs along guide tracks in a common plane and through lower return runs, with drive and return sprockets on respective common axes between respective ends of the runs.

It is also feasible, with some containers or products, to use two chains, one carrying propelling flights and the other carrying leading flights, again with guide tracks in a common plane for forwarding runs and drive and return sprockets on respective common axes between respective ends of the forwarding runs and the return runs for the chains.

Again, in either case, there is a limit imposed on the closest transverse spacing of the flights by the widths of the chains.

SUMMARY OF THE INVENTION

An object of the invention is, therefore, to provide guide tracks for two or more chains with flights enabling a closer minimum transverse spacing of the flights than with the known arrangements described above.

According to one aspect of the present invention, a conveyor comprises two parallel endless chains (or the like) carrying flights, and guide tracks for the chains in a forwarding run consisting of an inner guide track and an outer guide track with respect to the direction in which the flights projects from the chains, the guide tracks also being disposed so that one chain overlaps the other in a plane parallel to the direction in which the flights project, and the flights projecting from the outer side of the chains.

Thus a closer spacing of the flights can be achieved than with the known arrangements, and especially in a lesser overall width in the transverse direction.

The conveyor may be disposed with its flights horizontal, e.g., to provide leading and propelling flights for moving shallow containers along a supporting surface or surfaces.

The guide tracks may be formed by inner and outer rails bolted through spacers to a frame member, with the outer rail of the inner track and the inner rail of the outer track on a common bolt.

Alternatively, in an even more compact arrangement, the guide tracks may be formed by channels in a single elongate guide member, which may be formed of low-friction material, or channels in a metal member may be provided with low-friction liners contacting the chains, the elongate guide member being securable to a frame member.

According to another aspect of the present invention, a conveyor comprises three parallel endless chains (or the like) carrying flights, and guide tracks for the chains in a forwarding run with at least one guide track disposed inwardly of the other two guide tracks with respect to the direction in which the flights project from the chains and overlapping at least one of the other two guide tracks in a plane parallel to the direction in which the flights project.

With the flights on the chain in the inner guide track extending between the other two guide tracks, the flights on the chains in those other guide tracks may extend from the nearer sides of those chains or from the farther sides of those chains.

The inner guide track and one of the outer guide tracks may be formed by channels in a single elongate guide member, the other outer guide track being formed by a channel in its own individual elongate guide member, the elongate guide members being securable to respective frame members, and each elongate guide member may be formed of low-friction material, or each channel in metal members may be provided with a low-friction liner contacting the respective chain.

Alternatively, with all the flights extending from the same side of all three chains, two guide tracks may be disposed inwardly of the other guide track, one beyond the other; and all three guide tracks may be formed by channels in a single elongate guide member, which may be formed of low-friction material, or each channel in a metal member may be provided with a low-friction liner contacting the respective chain.

According to a further aspect of the invention, a conveyor comprises two pairs of parallel endless chains (or the like) carrying flights, and two pairs of guide tracks for the chains in a forwarding run consisting of an inner pair of guide tracks and an outer pair of guide tracks with respect to the direction in which the flights project from the chains, the guide tracks also being disposed so that one guide track in each pair overlaps one guide track in the other pair in a plane parallel to the direction in which the flights project.

All the flights may extend from the nearer sides of the chains or from the farther sides of the chains, or the flights on one pair of chains may extend from the nearer sides while the flights on the other pair of chains extend from the farther sides.

Means are preferably provided for adjusting the spacing of one pair of inner and outer guide tracks with respect to the other pair of inner and outer guide tracks.

Conveniently each pair of inner and outer guide tracks is formed by a pair of channels in a common elongate guide member, which may be formed of low-friction material, or channels in a metal member may be provided with low-friction liners contacting the chains, the elongate guide members being securable to respective frame members by means for adjusting the spacing between the elongate guide members.

The usual disposition of the conveyor will be with the flights extending vertically, so that in the forwarding run the flights will extend upwardly from lower chains (in the inner guide tracks) and upper chains (in the outer guide tracks).

It will be evident that flights on the lower chains will have to be of a length enabling them to extend past the respective upper chains and project above the guide tracks thereof, whereas flights on the upper chains require a much lesser length to project above those guide tracks, even though the respective sets of flights (i.e. leading and trailing or propelling) need not project to the same extent above the upper guide tracks.

The chains will require a similar disposition in a return run and may conveniently be provided with similar guide tracks, similarly provided by channels in elongate guide members as described above, but with an inverted disposition of the pairs of channels.

The outer pairs of chains will have to extend further than the inner pair of chains, e.g., to driving and return sprockets for the outer chains further apart than driving and return sprockets for the inner chains, and the speed ratios between the pairs of driving sprockets will be such that the inner and outer chains and their respective flights have the same linear speed along the forward run.

However, in accordance with a significant further feature of the invention, elongate guide members in the forwarding and return runs are preferably provided at one end of the conveyor with a pair of guide blocks with semicircular low-friction track portions of different diameters corresponding to the respective spacings of the inner and outer chains, and the guide blocks are preferably provided with means of adjustment of their positions relative to the elongate guide members for tensioning of the chains; and the guide blocks preferably also have parallel track portions tangential to the semicircular portions (and adjacent to the elongate guide members) to afford a smooth transition between the elongate guide members and the guide blocks. It will be evident that at the other end of the conveyor the chains will engage separate pairs of driving sprockets.

Both pairs of channels in the elongate guide members may open towards the vertical centreplane of the conveyor (or away from it), and the lower (or inner) channels may be staggered with respect to the upper (or outer) channels inwardly (or outwardly) by an amount allowing the flights on the lower (or inner) chains to pass the flights on the upper (or outer) chains with slight clearance; alternatively, the flights on the lower (or inner) chains may be provided with distance pieces between themselves and their chain links to displace them laterally clear of the flights on the upper (or outer) chains.

Alternatively, one pair of channels opens towards the vertical centreplane of the conveyor and the other pair of channels opens away from it, whereby the flights on the upper (or outer) chains extend from between the assemblies and the flights on the lower (or inner) chains extend from outside the assemblies, or vice versa.

The bottom (or back) of a guide channel may be provided with a longitudinal recess or a series of spaced recesses for receipt and location of the heads of fixing bolts passing through holes in the elongate guide member to enable it to be secured to a support member, one such support member being provided with each assembly, and the means for adjusting the spacing being provided between the two support members, which are adapted to be mounted in a conveyor frame. However, each elongate guide member may be provided alternatively or in addition, with a longitudinal bolting flange, above and/or below the guide channel or channels.

Each elongate guide member may be provided with a top rail of low-friction material for contacting containers to be propelled therealong.

BRIEF DESCRIPTION OF THE DRAWING

A number of embodiments of the invention will now be described, by way of example only, with reference to the accompanying drawings, in which.

DETAILED DESCRIPTION OF THE INVENTION

Figure 1:
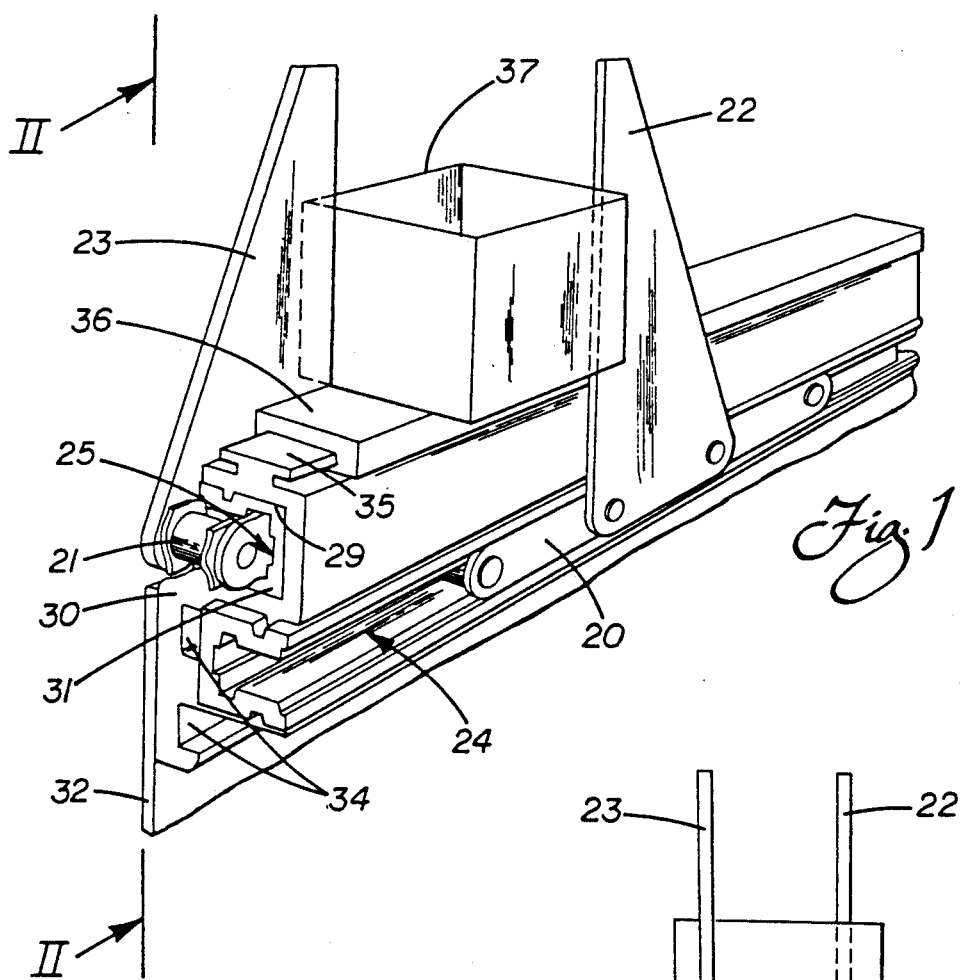
FIG. 1 is a perspective view of a short portion of the forwarding run of a conveyor in accordance with the invention having two chains.
Figure 2:
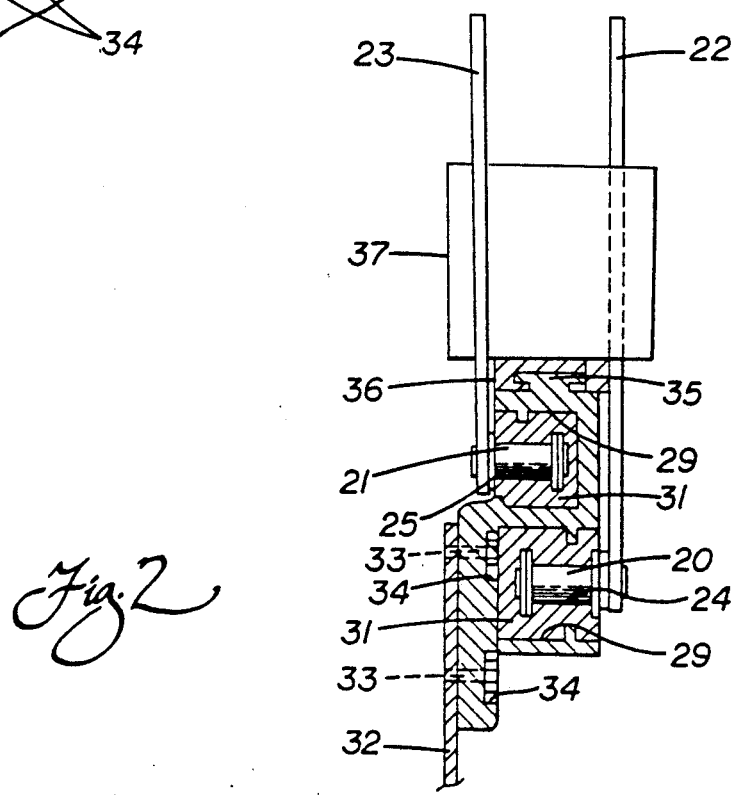
FIG. 2 is a part-sectional view taken from the line 11—11 of FIG. 1.

In FIGS. 1 and 2, two parallel endless chains 20, 21 (see also FIG. 12) carry flights 22, 23 (only one being shown on each chain respectively) and run along guide tracks consisting of an inner (or lower) guide track 24 for the chain 20 and an outer (or upper) guide track 25 for the chain 21, the guide tracks being disposed so that one chain overlaps the other in a plane parallel to the direction in which the flights project, and the flights projecting from the outer sides of both chains.

Figure 3:
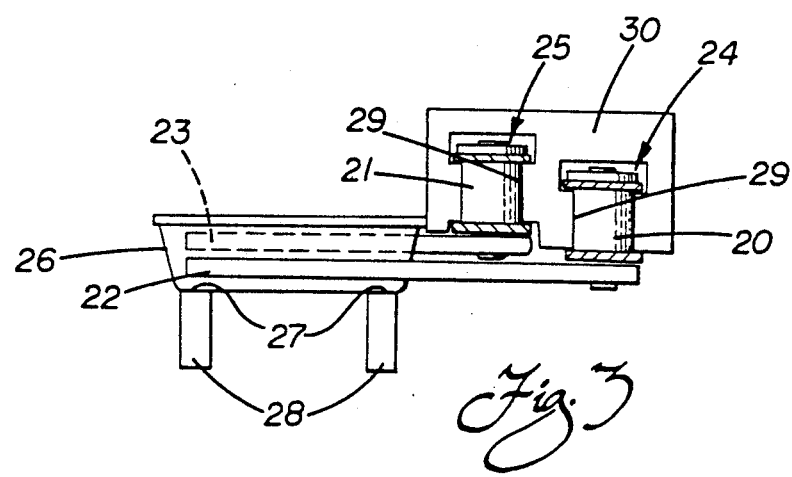
FIG. 3 is a diagrammatic section of another embodiment having two chains.

Thus a closer spacing of the flights 22, 23 can be achieved than with the known arrangements especially in a lesser overall width in the transverse direction, and more particularly so in the embodiment shown diagrammatically in FIG. 3 in which the conveyor is disposed with its flights horizontal to provide leading and propelling flights 22, 23 respectively for moving shallow containers 26 along supporting surfaces 27 on rails 28.

The guide tracks 24, 25 are formed by channels 29 in a single elongate guide member 30, which may be formed of low-friction material, or (as shown in FIGS. 1 and 2) channels 29 in a metal member 30 may be provided with low-friction liners 31 contacting the chains 20, 21, the elongate guide member 30 being secured to a frame member 32 by screws or bolts 33 having their heads accommodated in longitudinal grooves 34. Also in FIGS. 1 and 2 the elongate metal guide member 30 has a longitudinal T-shaped rib 35 on to which is fitted a top rail 36 of low-friction material for contacting containers 37 propelled therealong.

Figure 4:
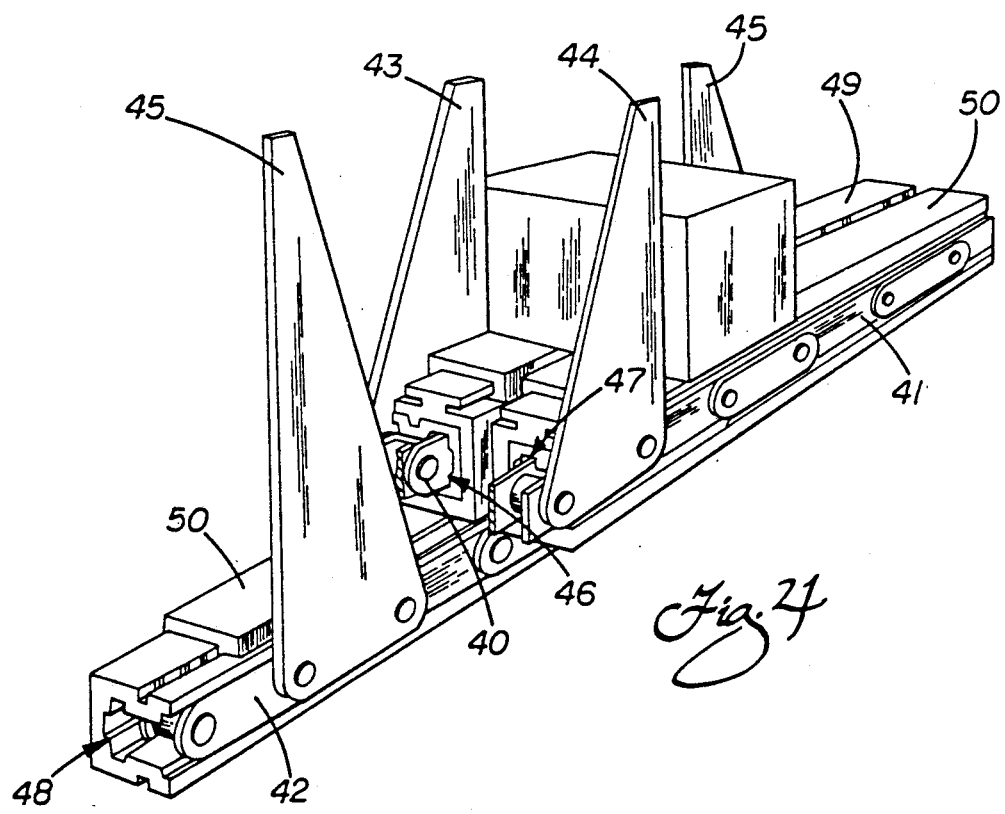
FIG. 4 corresponds to FIG. 1 but shows an embodiment having three chains.
Figure 5:
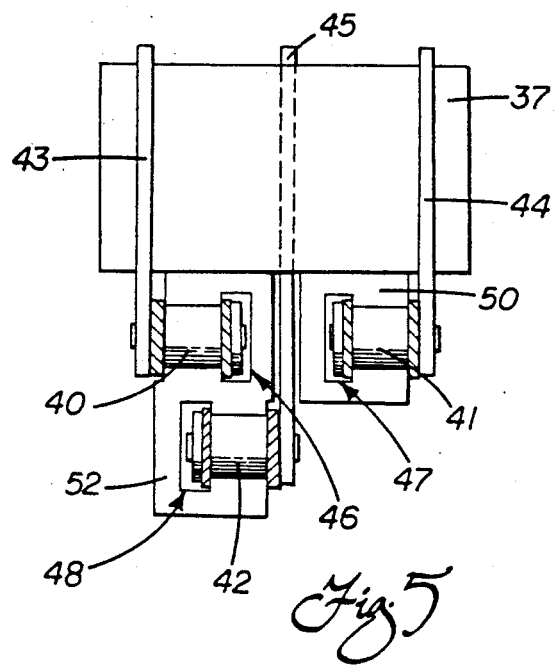
FIGS. 5, 6 and 7 are diagrammatic sections of other embodiments having three of chains.
Figure 6:
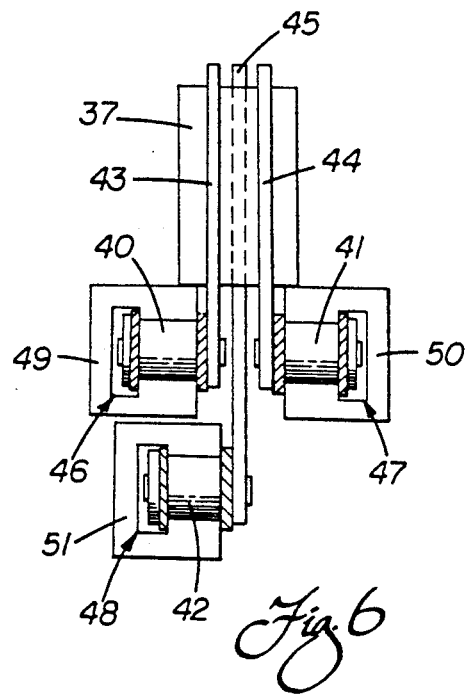

In FIGS. 4 to 7, three parallel endless chains 40, 41, 42 carry flights 43, 44, 45 and run along guide tracks 46, 47, 48, and in FIGS. 4 to 6 one guide track 48 is disposed inwardly of (or below) the other two guide tracks 46, 47 with respect to the direction in which the flights project from the chains and overlaps the guide track 46 in a plane parallel to the direction in which the flights project.

The diagrammatic FIG. 5 has the same disposition of flights as in the detailed perspective FIG. 4, i.e., the flights 45 on the chain 42 in the inner guide track 48 extend between the other two guide tracks 46, 47, and the flights 43, 44 on the chains 40, 41 in those other guide tracks extend from the farther sides of those chains. In FIG. 4 each guide track 46, 47, 48 has its own individual elongate guide member 49, 50, 51 respectively (with liners 31 contacting the chains), while in FIG. 5 the guide tracks 46 and 48 are formed by channels in one elongate guide member 52.

Figure 7:
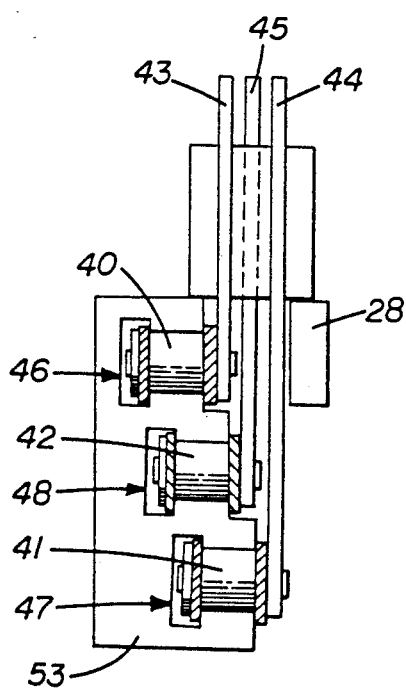

In FIG. 6 the flights 43, 44 on the chains 40, 41 in two outer (or upper) tracks 46, 47 extend from the nearer sides of those chains, thus being able to achieve a very close disposition of all the flights to suit a narrow article 37. Although the guide tracks 46, 47, 48 are again shown in individual elongate guide members 49, 50, 51, the guide tracks 46, 48 could alternatively be formed in one elongate guide member. In FIG. 7, a similar close spacing of the flights 43, 44, 45 is achieved by having all the flights extending from the same side of all three chains 40, 41, 42, two guide tracks 47, 48 being disposed inwardly of (or below) the other guide track 46, one beyond the other, and all three guide tracks are shown formed in a single elongate guide member 53.

Figure 8:
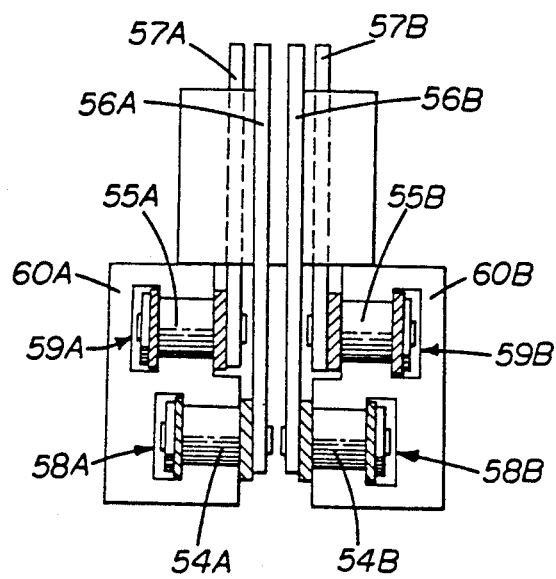
FIGS. 8, 9, 10 and 11 are diagrammatic sections of embodiments having two pairs of chains.

Another close disposition of flights is achievable with the embodiment of FIG. 8 in which a conveyor comprises two pairs of parallel endless chains 54A, 54B and 55A, 55B carrying flights 56A, 56B and 57A, 57B, and two pairs of guide tracks for the chains in a forwarding run consisting of an inner (or lower) pair of guide tracks 58A, 58B and an outer (or upper) pair of guide tracks 59A, 59B with respect to the direction in which the flights project from the chains, the guide tracks also being disposed so that one guide track 58A or 58B in each pair overlaps one guide track 59A or 59B in the other in a plane parallel to the direction in which the flights project, and all the flights extending from the nearer sides of the chains. One guide track of each pair is provided in a common elongate guide member 60A, 60B respectively.

Figure 9:
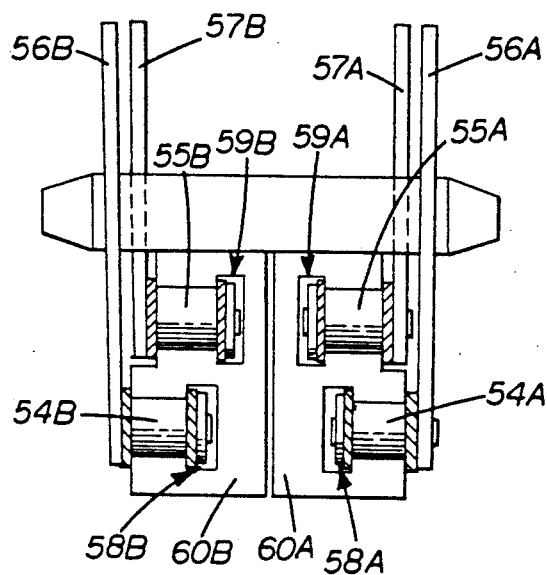

In FIG. 9, the two assemblies of, on the one hand, the elongate guide member 60A with guide tracks 58A, 59A, chains 54A, 55A and flights 56A, 57A, and, on the other hand, the elongate guide member 60B with guide tracks 58B, 59B, chains 54B, 55B and flights 56B, 57B have been interchanged to cause the flights to extend from the farther sides of the chains and so provide a wider spacing of the flights in the two assemblies, to suit a wider article, without increasing the overall transverse dimension of the combined assemblies.

Figure 10:
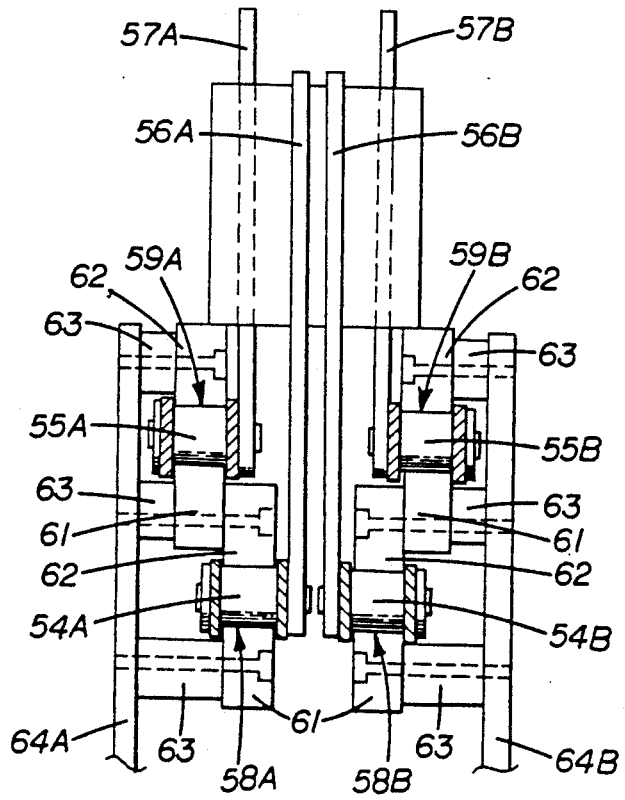

The embodiment of FIG. 10 is similar in disposition to the embodiment of FIG. 8, but the tracks 58A, 58B, 59A, 59B are each formed by inner and outer (or lower and upper) rails 61, 62 respectively bolted through spacers 63 to frame members 64A, 64B, with the outer rail 62 of the inner track 58A or 58B and the inner rail 61 of the outer track 59A or 59B on a common bolt.

Figure 11:
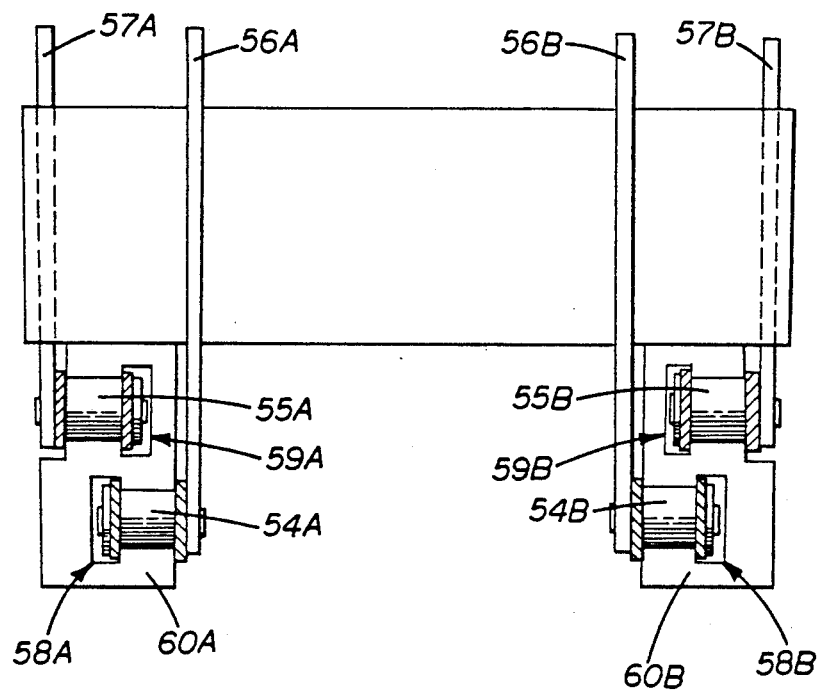

It will be evident from a comparison with any of FIGS. 8, 9 and 10 with FIG. 11 that "mirror image" assemblies of elongate guide members with guide tracks, chains and flights can be readily spaced apart to suit any width of article. However, it will be seen that the assemblies shown in FIG. 11 differ from those of FIGS. 8 and 9 in that the tracks in each elongate guide member face or open to opposite sides; this renders possible a comparison of the left hand assembly in FIG. 11 with the assembly of FIGS. 1 and 2, which is a preferred embodiment for use in a conveyor of packaging machinery having a "mirror image" assembly similarly secured to a frame member which is movable with respect to the frame member to adjust the spacing of assemblies, and the further description will include the same reference numerals as in FIGS. 1 and 2 where appropriate.

The chains will require a similar disposition in a return run and are conveniently provided with similar guide tracks, similarly provided by channels in elongate guide members as described above, but with an inverted disposition of the pairs of channels, see FIGS. 17 and 19 in particular and which will now be described in conjunction with diagrammatic FIG. 12 and FIGS. 13 to 16 and FIG. 18 showing details of novel chain guiding and automatic tensioning means.

Figure 12:
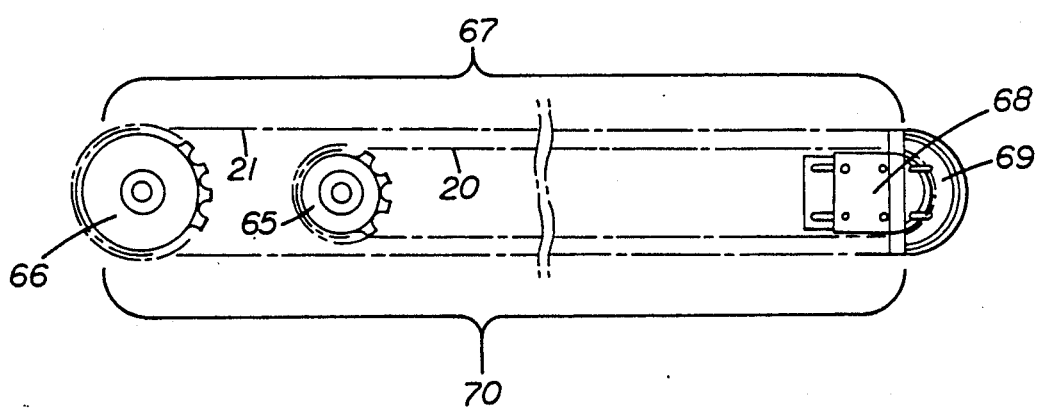
FIG. 12 is a diagrammatic side elevation showing how two conveyor chains, e.g., as in FIGS. 1 and 2 or at one side of any one of FIGS. 8, 9, 10 or 11, are trained around separate driving sprockets at one end of the conveyor and around a pair of guide blocks at the other end.
Figure 13:
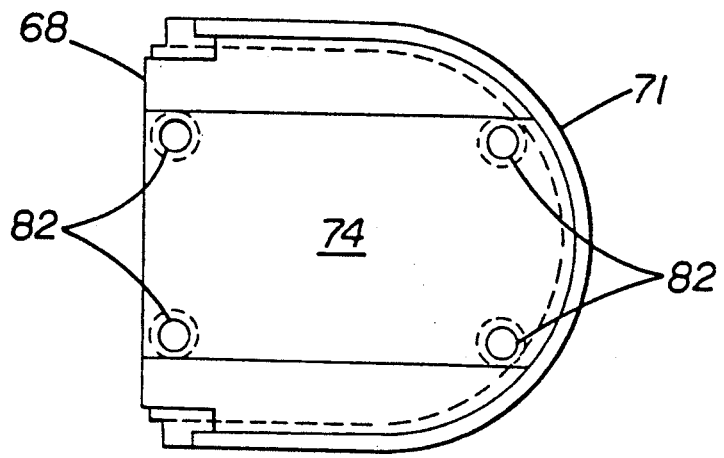
FIGS. 13 and 14 are respective side elevations of the guide block for the inner chain in FIG. 12.
Figure 14:
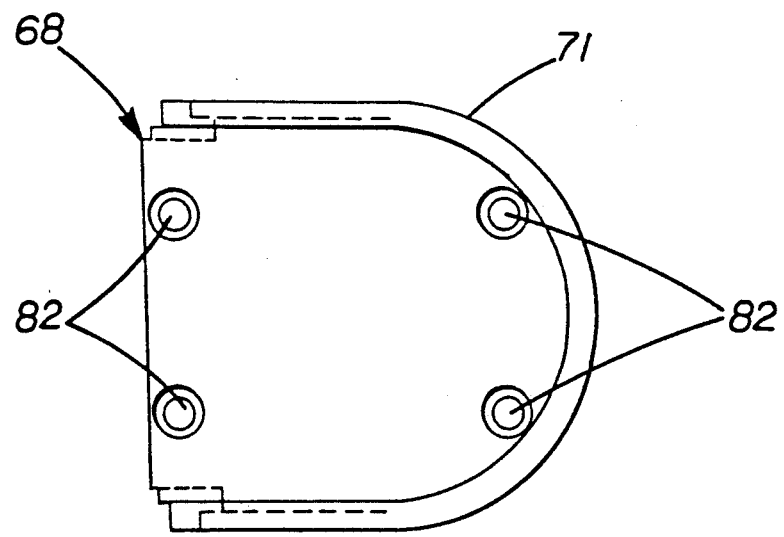
Figure 15:
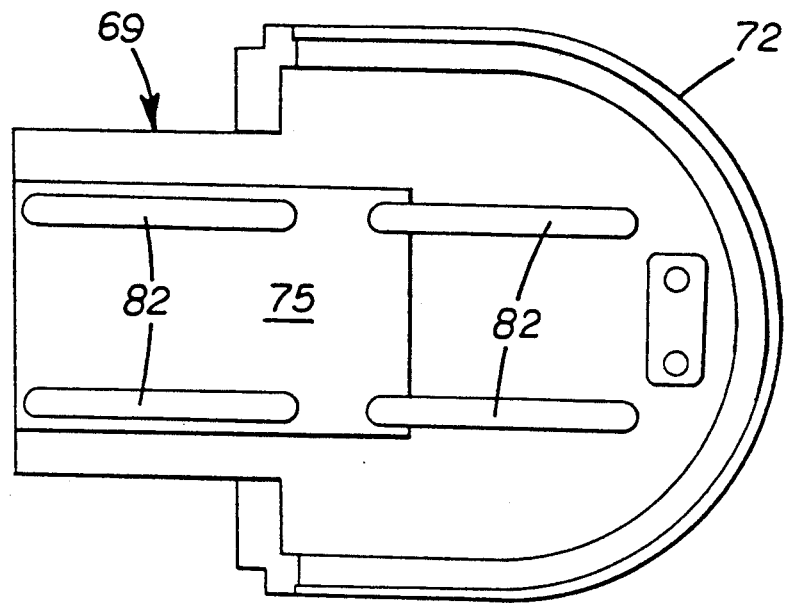
FIGS. 15 and 16 are respective side elevations of the guide block for the outer chain in FIG. 12.
Figure 16:
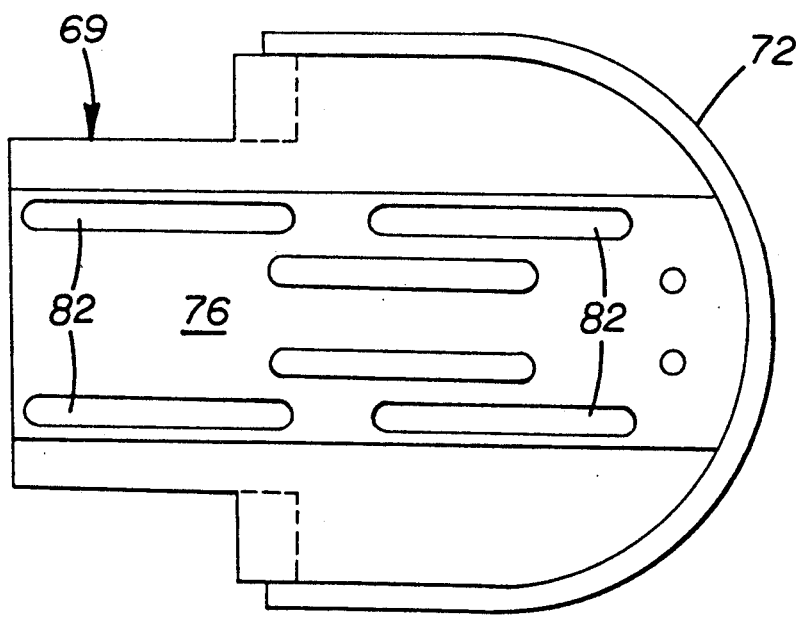

It will be evident from FIG. 12 that the outer pairs of chains 21 extend further than the inner pairs of chains 20 to driving sprockets 66, 65 respectively, and the speed ratios between the pairs of sprockets will be such that the inner and outer chains and their respective flights (not shown) have the same linear speed along the forward run 67. A similar arrangement could be provided for pairs of return sprockets, but—in accordance with a further aspect of the invention—a pair of guide blocks 68, 69 (see FIGS. 13 to 19) are provided to guide the chains 20, 21 from the return run 70 into the forward run.

The guide blocks 68, 69 are formed of low-friction material and have semicircular track portions 71, 72 of different diameters corresponding to the respective spacings of the inner and outer chains 20, 21 and the guide blocks are provided with means of adjustment 73 (FIGS. 17 and 18) for tensioning of the chains.

The inner guide block 68 has a longitudinal recess 74 with parallel sides for slidably engaging a complementary projection 75 on one side of the outer guide block 69, the other side of which has a longer but lesser similar projection 76 for slidably engaging a longitudinal slot 77 in the frame member 32, and the assembly of guide blocks 68, 69 is held in place by a plate 78 overlapping the longitudinal edges of the slot 77 and by nuts 79 on bolts 80 through holes 81 in the inner guide member 68 and slots 82 in the outer guide member 69.

Figure 19:
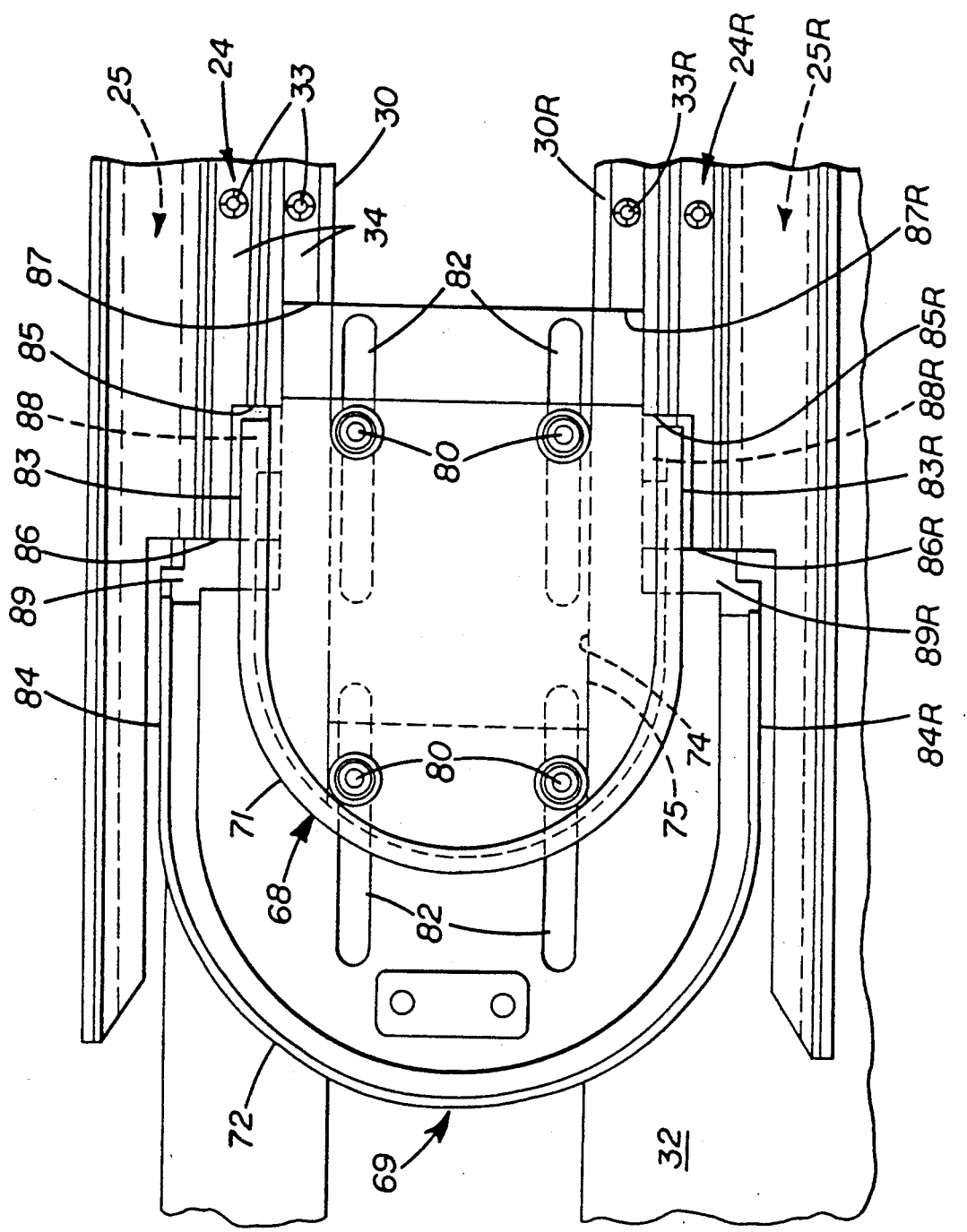
FIG. 19 is a fragmentary view in the direction of arrow XIX in FIG. 17 showing the initial positions of the guide blocks in relation to the elongate guide members.

The guide blocks 68 and 69 have parallel track portions 83, 83R and 84, 84R respectively tangential to the semicircular portions 71 and 72 to afford a smooth transition between the elongate guide members 30 (in the forwarding run) and 30R in the return run, the initial assembly position being shown in FIG. 19 in which the inner guide block 68 abuts steps 85, 85R in the guide members 30, 30R between pairs of steps 86, 87 and 86R, 87R abutted by the outer guide block 69. The liners 31 for the guide tracks 24, 25 (and 24R, 25R) have been omitted from FIG. 19, as have also the chains 20, 21 and flights 22, 23, for the sake of clarity, but chamfers 88 and 89 on the guide blocks will be matched by chamfers on the ends of the liners as a further aid to a smooth transition.

Figure 17:
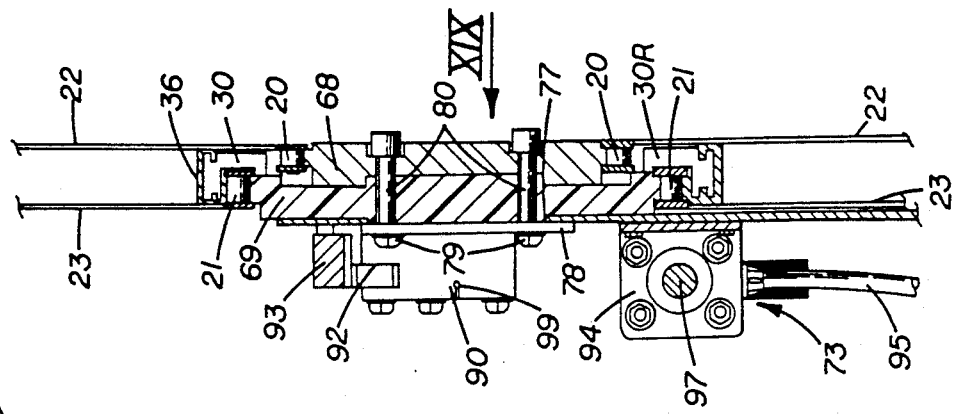
FIG. 17 is a vertical section, taken from the line XVII—XVII of FIG. 18, showing the two guide blocks assembled together on a frame plate of a conveyor assembly.
Figure 18:
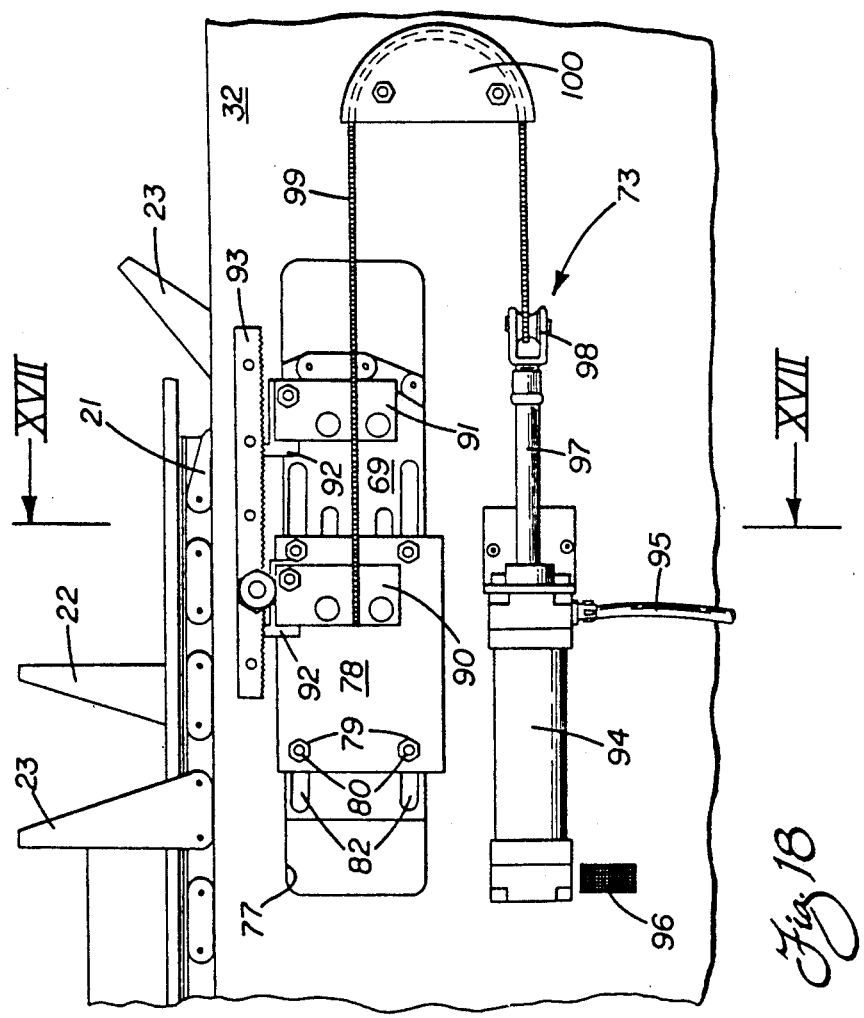
FIG. 18 is an elevation from the left hand side of FIG. 17 showing means of adjustment of the positions of the guide blocks for tensioning of the chains.

FIGS. 17 AND 18 show a clamp 90 secured to the inner guide block 68 by being bolted to the plate 78, and a clamp 91 bolted to the outer guide block 69, each clamp having an upwardly spring-loaded pawl 92 engaging a ratchet bar 93, all being parts of the adjustment means 73, which also consists of an air cylinder 94 having a pressure air inlet 95 and an exhaust outlet 96 with a filter, the piston rod 97 of the air cylinder having a pulley 98 around which passes a wire cable 99 extending between the clamps 90, 91 and around a semecircular guide 100. The air cylinder 94 is pressurized periodically to pull on both guide blocks (through the wire cable 99 and clamps 90, 91) to tension the chains 20,21 (if necessary), the ratchet bar 93 and pawls 92 holding the tension so that the air cylinder 94 can be de-pressurized.

I claim:

1. A conveyor for transporting cartons or like containers, comprising:
   two parallel endless chains;
   flights attached to said chains for propelling and retaining cartons or like containers, said propelling and retainer flights being in different parallel planes to provide stability for said containers; and
   guide tracks for said chains in a forwarding run, said guide tracks including an inner guide track and an outer guide track with respect to the direction in which said flights project from said chains, said guide tracks also being disposed such that one of said chains overlaps the other of said chains in a plane substantially parallel to the direction in which the flights project to engage said containers.

2. A conveyor as in claim 1, wherein said flights are disposed in a horizontal direction.

3. A conveyor as in claim 1, wherein said guide tracks are formed by inner and outer rails bolted through spacers to a frame member, said outer rail of said inner guide track and said inner rail of said outer guide track being fastened by a common bolt.

4. A conveyor as in claim 1, wherein said guide tracks are formed by channels in a single elongate guide member, said elongate guide member being securable to a frame member.

5. A conveyor as in claim 4, wherein said elongate guide member is formed of low-friction material.

6. A conveyor as in claim 4, wherein said elongate guide member is formed of metal and said channels are provided with low-friction liners.

7. A conveyor as in claim 4, wherein said chains are provided with similar guide tracks in a return run, said guide tracks similarly provided by channels in a single elongate guide member with an inverted disposition of said channels.

8. A conveyor as in claim 1, wherein said flights extend from the outer side of said chains.

9. A conveyor for transporting cartons or like containers, comprising:
   three parallel endless chains;
   flights attached to said chains for propelling and retaining cartons or like containers, said propelling and retaining flights being in different parallel planes to provide stability for said containers; and
   guide tracks for said chains in a forwarding run, wherein at least one of said guide tracks is disposed inwardly of the other two outer guide tracks with respect to the direction in which said flights project from said chains and overlaps at least one of said two guide tracks in a plane substantially parallel to the direction in which said flights projects to engage said containers.

10. A conveyor as in claim 9, wherein said flights on said chain in the inner guide track extend between said two outer guide tracks.

11. A conveyor as in claim 10, wherein said flights on the chains in said two outer guide tracks extend from the nearer sides of said chains.

12. A conveyor as in claim 10, wherein said flights on said chains in said two outer guide tracks extend from the farther sides of said chains.

13. A conveyor as in claim 9, wherein said inner guide track and one of said outer guide tracks are formed by channels in a single elongate guide member, the other of said outer guide tracks being formed by a channel in its own individual elongate guide member.

14. A conveyor as in claim 9, wherein said flights extend from the same side of all three of said chains, two of said guide tracks being disposed inwardly of the other of said guide tracks, one beyond the other, and all of said guide tracks being formed by channels in a single elongate guide member.

15. A conveyor for transporting cartons of like containers, comprising:
   two pairs of endless chains;
   flights attached to said chains for propelling and retaining cartons or like containers, said propelling and retaining flights being in different parallel planes to provide stability for said containers; and
   two pairs of guide tracks for said chains in a forwarding run, wherein one pair of guide tracks is disposed inwardly of the other pair of guide tracks with respect to the direction in which said flights project from said chains, said guide tracks also being disposed so that one guide track in each of said pair of said guide tracks overlaps one guide track in the other of said pair in a plane substantially parallel to the direction in which said flighs project to engage said cartons.

16. A conveyor as in claim 15, wherein all of said flights extend from the nearer sides of said chains.

17. A conveyor as in claim 15, wherein all of said flights extend from the farther sides of said chains.

18. A conveyor as in claim 15, wherein said flights on one pair of said chains extend from the nearer sides of said pair of said chains, while said flights on the second pair of said chains extend from the farther sides of said second pair of said chains.

19. A conveyor as in claim 15, wherein adjustment means is provided for adjusting the spacing of one pair of said inner and outer guide tracks with respect to the other pair of said inner and outer guide tracks.

20. A conveyor as in claim 15, wherein each of said pair of said inner and outer guide tracks is formed by a pair of channels in a common elongate guide member, said elongate guide member being securable to respective frame members by adjustment means for adjusting the spacing between said elongate guide members.

21. A conveyor for transporting cartons or like containers, comprising:

two parallel endless chains;

flights attached to said chains for propelling and retaining cartons or like containers, said propelling and retaining flights being in different parallel planes to provide stability for said containers; and guide tracks for said chains in a forwarding run, said guide tracks including an inner guide track and an outer guide track with respect to the direction in which said flights project from said chains, said guide tracks also being disposed such that one of said chains overlaps the other of said chains in a plane substantially parallel to the direction in which the flights project, said forwarding run guide tracks being formed by channels in a single elongate guide member, guide tracks for said chains in a return run, said return run guide tracks being provided by channels in a single elongate guide member, said elongate guide members in said forwarding and return runs being provided at one end of said conveyor with a pair of guide blocks with semicircular low-friction track portions of different diameters corresponding to the respective spacings of said inner and outer chains.

22. A conveyor as in claim 21, wherein said guide blocks are provided with adjustment means for adjusting the positions of said guide blocks relative to said elongate guide members, whereby tensioning of said chains is accomplished.

23. A conveyor as in claim 21, wherein said guide blocks have parallel track portions tangential to said semicircular portions to afford a smooth transition between said elongate guide members and said guide blocks.

* * * * *